(12) United States Patent
Zhu et al.

(10) Patent No.: US 9,397,736 B2
(45) Date of Patent: Jul. 19, 2016

(54) QUANTIZED EIGEN BEAMS FOR CONTROLLING ANTENNA ARRAY ELEMENTS IN A WIRELESS NETWORK

(71) Applicant: Intel IP Corporation, Santa Clara, CA (US)

(72) Inventors: Yuan Zhu, Beijing (CN); Qinghua Li, San Ramon, CA (US); Yushu Zhang, Beijing (CN); Debdeep Chatterjee, Santa Clara, CA (US); Gang Xiong, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/695,800

(22) Filed: Apr. 24, 2015

(65) Prior Publication Data

US 2016/0149617 A1 May 26, 2016

Related U.S. Application Data

(60) Provisional application No. 62/083,103, filed on Nov. 21, 2014.

(51) Int. Cl.
| | | |
|---|---|---|
| H04B 7/06 | (2006.01) |
| H04B 7/04 | (2006.01) |
| H04L 5/00 | (2006.01) |

(52) U.S. Cl.
CPC ............. *H04B 7/043* (2013.01); *H04B 7/0626* (2013.01); *H04L 5/0007* (2013.01); *H04L 5/0048* (2013.01)

(58) Field of Classification Search
CPC .... H04B 7/043; H04B 7/0626; H04L 5/0048; H04L 5/0007
See application file for complete search history.

(56) References Cited

U.S. PATENT DOCUMENTS

| | | | | |
|---|---|---|---|---|
| 7,684,761 | B2 * | 3/2010 | Hottinen | H04B 7/0617 375/146 |
| 9,184,806 | B2 * | 11/2015 | Kim | H04B 7/0408 |
| 2004/0042427 | A1 * | 3/2004 | Hottinen | H04L 1/0027 370/335 |
| 2006/0094373 | A1 * | 5/2006 | Hottinen | H04B 7/0617 455/73 |
| 2006/0203891 | A1 * | 9/2006 | Sampath | H04B 7/0417 375/132 |
| 2010/0104033 | A1 * | 4/2010 | Gorokhov | H04L 1/0026 375/260 |

(Continued)

OTHER PUBLICATIONS

International Application Serial No. PCT/US2015/060592, International Search Report mailed Mar. 31, 2016, 3 pgs.

(Continued)

*Primary Examiner* — Jean B Corrielus
(74) *Attorney, Agent, or Firm* — Schwegman Lundberg & Woessner, P.A.

(57) ABSTRACT

A user equipment (UE) may communicate channel state information in a wireless network. The UE may include transceiver circuitry to receive orthogonal frequency division multiple access (OFDMA) signals from an Enhanced node B (eNB). The UE may include processing circuitry to derive one or more principal eigen beams from the received OFDMA signals. The principal eigen beams may have a rank greater than or equal to one. The processing circuitry may derive quantized eigen beams from the principal eigen beams. The processing circuitry may select, in response to the quantized eigen beams, a subset of available antenna ports on the eNB for receiving from the eNB and transmitting to the eNB. The UE may communicate to the eNB a bit pattern of the quantized eigen beams and at least one of a wideband channel quality indicator (CQI) or a subband CQI conditioned on the quantized eigen beams.

19 Claims, 8 Drawing Sheets

(56) References Cited

U.S. PATENT DOCUMENTS

| | | | |
|---|---|---|---|
| 2010/0255790 A1* | 10/2010 | Farajidana | H04B 17/26 |
| | | | 455/69 |
| 2010/0273499 A1* | 10/2010 | van Rensburg | H04W 72/1231 |
| | | | 455/450 |
| 2011/0205963 A1* | 8/2011 | Tang | H04B 7/0452 |
| | | | 370/328 |
| 2013/0163457 A1 | 6/2013 | Kim et al. | |
| 2014/0098689 A1* | 4/2014 | Lee | H04B 7/0469 |
| | | | 370/252 |
| 2014/0112406 A1* | 4/2014 | Zhu | H04B 7/0452 |
| | | | 375/267 |
| 2014/0177745 A1 | 6/2014 | Krishnamurthy et al. | |
| 2014/0286267 A1 | 9/2014 | Hui et al. | |
| 2015/0215014 A1* | 7/2015 | Zhu | H04L 25/0248 |
| | | | 375/267 |
| 2016/0013838 A1* | 1/2016 | Zhu | H04B 7/043 |
| | | | 375/267 |

OTHER PUBLICATIONS

International Application Serial No. PCT/US2015/060592, Written Opinion mailed Mar. 31, 2016, 4 pgs.

Catt, "Evaluation of EBF/FD-MIMO with beamformed CSI-RS with 16-64 TXRU", R1-144631, 3GPP TSG RAN WG1 Meeting #79, (Nov. 8, 2014), 1-2.

Fujitsu, "Discussion on possible CSI-RS enhancement for elevation beamforming/Full-dimension MIMO", R1-144645, 3GPP TSG RAN WG1 Meeting #79, (Nov. 8, 2014), 1-3.

* cited by examiner

QUANTIZED EIGEN BEAMS FOR CONTROLLING ANTENNA ARRAY ELEMENTS IN A WIRELESS NETWORK

PRIORITY APPLICATION

This application claims the benefit of priority to U.S. Provisional Patent Application Ser. No. 62/083,103, filed Nov. 21, 2014, which is incorporated herein by reference in its entirety.

TECHNICAL FIELD

Embodiments described herein generally relate to communicating in a wireless network.

BACKGROUND

A wireless device may include multiple antennas. For examples, the antennas may be arranged as antenna elements in an antenna array. There is ongoing effort to improve how the antenna elements are controlled.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In recent years, beamforming has become more common in user equipment (UE) devices, such as smart phones. For instance, a UE may use beamforming techniques to transmit preferentially in a direction toward an enhanced Node B (eNB; also referred to as an evolved Node B). Similarly, the eNB may transmit preferentially in a direction toward a UE. In some examples, at least one of a UE and an eNB may also receive in a preferential direction, with increased sensitivity for signals arriving from the preferential direction and reduced sensitivity for signals arriving from directions away from the preferential direction.

Beamforming may be implemented on devices and systems that include multiple antenna elements. For instance, a transmitter antenna array may transmit a signal from multiple antenna elements, where each antenna element may transmit the signal with its own specified phase delay and/or amplitude amplification. In some examples, the phase and amplitude factors may be controlled dynamically by the transmitting device, in order to maintain communication with a receiving device. Similarly, a receiving antenna array may receive a signal from multiple antenna elements, and may apply phase and amplitude factors to signals received from the antenna elements to enhance sensitivity in a particular direction. In some examples, the phase and amplitude factors may be controlled dynamically by the receiving device, in order to maintain communication with a transmitting device.

In some examples, a UE may communicate channel state information in a wireless network. The UE may include reception elements to receive orthogonal frequency division multiple access (OFDMA) signals from an eNB. The UE may include derivation logic to derive one or more principal eigen beams from the received OFDMA signals. The principal eigen beams may have a rank greater than or equal to one. The UE may include quantization logic to form quantized eigen beams from the principal eigen beams. Such quantized eigen beams may determine how one layer is transmitted from multiple antenna ports. In some examples, the quantization logic may use Givens rotation to perform the quantization. The UE may include communication logic to communicate to the eNB a bit pattern of the quantized eigen beams and at least one of a wideband channel quality indicator or a subband channel quality indicator conditioned on the quantized eigen beams.

Figure 1:
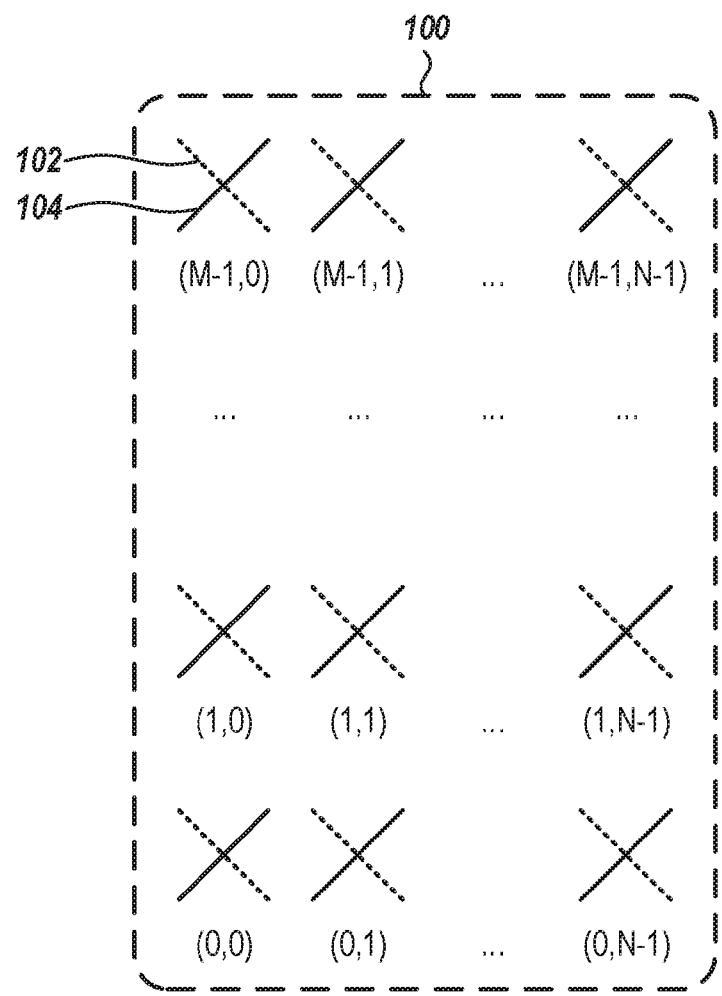
FIG. 1 shows an example of an antenna array having multiple antenna elements, in accordance with some embodiments.

FIG. 1 shows an example of an antenna array 100 having multiple antenna elements, in accordance with some embodiments. Such an antenna array 100 may be included in a UE or an eNB, or within other suitable devices. In some examples, antenna elements 102 and 104 may be located at or near the same lateral location in the antenna array 100, but with orientations that are perpendicular to each other. In some examples, the antenna array 100 may include pairs of perpendicularly-oriented antenna elements positioned in a two-dimensional planar arrangement. In the example of FIG. 1, antenna array 100 may be arranged as a rectangular grid that includes M rows and N columns. Each location in the grid may include a pair of antenna elements disposed within the plane of the antenna array 100, and inclined at +45 degrees and −45 degrees with respect to the rows/columns. In the example of FIG. 1, if M is 8 and N is 4, then the antenna array 100 includes 64 antenna elements. M and N may alternatively be any suitable positive integers.

A full-dimensional multiple-input multiple-output (FD-MIMO) system may be described mathematically by Eq. (1):

$$y = HPx + n \tag{1}$$

In Eq. (1), y is a receive vector having dimension $N_r \times 1$, where $N_r$ is a number of receiving antennas. x is a transmit vector having dimension $N_p \times 1$, where $N_p$ is a number of layers. H is a channel matrix having dimension $N_r \times N_t$, where $N_t$ is a number of transmitting antennas. P is a precoding matrix having dimension $N_t \times N_p$. n is a noise vector having dimension $N_r \times 1$. During use of a communication device, the device may form ongoing estimates of the channel matrix H. The estimated values of H may be used to drive the antennas accordingly.

In some examples, such as devices that use the LTE Advanced (LTE-A) mobile communication standard up to Release 12, a Cell Specific Reference Signal (CRS) and/or a Channel State Information Reference Signal (CSI-RS) may be used to measure the channel state information. Release 12 of the LTE-A specification allows for only 1, 2, or 4 antenna ports for CRS (often written as set {1, 2, 4}), and allows for only 1, 2, 4, or 8 antenna ports for CSI-RS (often written as set {1, 2, 4, 8}).

In some examples, number of antenna ports supported by the mobile communication standard may be fewer than the number of antenna elements in antenna array 100. For example, in the two-dimensional antenna array, 100, the number of transmitting antennas $N_t$ is given by $N_t=2NM$. In some examples, the numerical value of $N_t$ may be significantly larger than 8. For example, for M=8 and N=4, the number of antennas is $N_t=64$, which is significantly larger than the 8 antenna ports allowed by the mobile communication standard.

One way for a device to use $N_t$ antennas with only $N_c \in \{1, 2, 4, 8\}$ antenna ports is to virtualize the antennas into the antenna ports. This virtualization is represented mathematically by Eq. (2):

$$y = HP_cP_dx + n = \hat{H}P_dx + n \qquad (2)$$

Eq. (2) replaces the relatively large precoding matrix P with a product of two relatively small matrices, $P_c$ and $P_d$. Matrix $P_c$ has dimension $N_t \times N_c$, and matrix $P_d$ has dimension $N_c \times N_p$. In some examples, the number of antenna ports $N_c$ (such as 1, 2, 4, or 8) may be significantly smaller than the number of transmitting antennas $N_t$ (such as 64).

In Eq. (2), the channel matrix H is multiplied with matrix $P_d$ to form an effective channel matrix, $\hat{H}=HP_c$, having a dimension $N_r \times N_c$. The number of transmitting antennas $N_t$ may exceed the number of antenna ports $N_c$ by a factor of K, so that $N_t = N_c K$.

During the use of a communication device, the device may form ongoing estimates of the effective channel matrix $\hat{H}$ over time. In some examples, it may be significantly easier to form estimates of the relatively small effective channel matrix $\hat{H}$, which has dimension $N_r \times N_c$, than to form estimates of the relatively large channel matrix H, which has dimension $N_r \times N_t$. Estimates of the effective channel matrix $\hat{H}$ may provide the device with the information it uses to control its antennas.

In some examples, such as when an antenna virtualization matrix is updated slowly over time, for instance, once every 200 ms, the antenna virtualization may be implemented in the analog domain. In other examples, such as when the antenna virtualization matrix varies as a function of frequency, the antenna virtualization may be implemented in the digital domain. In some examples, such as updated the antenna virtualization matrix slowly over time and applying the antenna virtualization matrix to the full system bandwidth, e.g. in the time scale of user arrival/departure or even slower, the antenna virtualization may be implemented in either the analog or digital domains.

Estimating of the effective channel matrix $\hat{H}$ may depend on selecting matrices $P_c$ and $P_d$ with care. In some examples, matrix $P_c$ may be designed semi-statically by the eNB. For some examples, matrix $P_c$ may remain effectively constant from estimation to estimation. In some examples, matrix $P_d$ may be designed using a codebook to quantize the measured effective channel Such a codebook depends on the design of matrix $P_c$.

In some examples, matrix $P_c$ may subtract the major channel directions of all the active UEs in one cell into $N_c$ basic channel directions. In some examples, each individual UE preferential channel direction becomes a combination of those $N_c$ basic channel directions of one cell. In some examples, such a matrix $P_c$ may be used for both time-division duplexing (TDD) and frequency-division duplexing (FDD).

In some examples, matrix $P_c$ may be formed with a principle of an ideal subspace, where each antenna port virtualization vector may be calculated from an uplink composite channel covariance matrix.

For a given UE denoted by user k, an eNB may use uplink sounding to estimate an uplink channel matrix $\widetilde{H}_k$ for the user k. The eNB may use single value decomposition to calculate principal eigen beams from an average channel covariance matrix of all UEs, as in Eq. (3):

$$1/K \Sigma \widetilde{H}_k{}^H \widetilde{H}_k = USV^H \qquad (3)$$

In Eq. (3), vector V is formed as $V=[v_1 \ldots v_{N_{tx}}]$, where $v_c$ is the $c^{th}$ principal eigen beam. In some examples, the eNB may first construct matrix $P_c$ from the $N_c$ largest principal eigen beams from the average channel covariance matrix. In some examples, the eNB may select the $N_c$ largest principal eigen beams from the average channel covariance matrix of Eq. (3). The eNB may normalize the energy of the eigen beams by dividing all the eigen beams by the square root of $N_c$. The eNB may assemble the $N_c$ largest principal eigen beams, all normalized, to form matrix $P_c$, as in Eq. (4):

$$P_c = [v_1 \ldots v_{N_c}]/\sqrt{N_c} \qquad (4)$$

In some examples, once matrix $P_c$ is obtained from Eq. (4), the eNB or UE may quantize the principal eigen beams for the effective channel matrix, $\hat{H}=HP_c$, and arrive at matrix $P_d$.

In some examples, the eNB or UE may use single value decomposition to extract the principal eigen beam of the effective channel matrix $\hat{H}$, as in Eq. (5):

$$\hat{H} = \hat{U}\hat{S}\hat{V}^H \qquad (5)$$

In Eq. (5), rank r precoder $\hat{V}_r = [\hat{v}_1 \ldots \hat{v}_r]/\sqrt{r}$ is formed from eigen beams $v_c$ of the effective channel matrix $\hat{H}$. Rank r satisfies the condition of $1 \leq r \leq \min(N_c, N_r)$.

In some examples, the eNB or UE may use Givens rotation to quantize the eigen beam based precoder. The following example uses rank r=2, although any suitable rank may be used, including 1, more than 1, 2, 3, 4, 5, 6, or more than 6.

Precoder matrix $\hat{V}_2$ of rank r=2 is given by Eq. (6):

$$\hat{V}_2 = [\hat{v}_1 \hat{v}_2]/\sqrt{2} \qquad (6)$$

In Eq. (6), each eigen beam $\hat{v}_1, \hat{v}_2$ is given by Eq. (7):

$$\hat{v}_k = \begin{bmatrix} a_{0,k} \\ a_{1,k} \\ a_{2,k} \\ a_{3,k} \\ a_{4,k} \\ a_{5,k} \\ a_{6,k} \\ a_{7,k} \end{bmatrix} \qquad (7)$$

In Eq. (7), eigen beams $\hat{v}_1, \hat{v}_2$ satisfy the condition of Eq. (8):

$$|\hat{v}_i^H \hat{v}_j| = \begin{cases} 0, & i \neq j \\ 1, & i = j \end{cases} \quad 0 \leq i, j \leq 1 \quad (8)$$

Combining Eqs. (6) and (7), precoder matrix $\hat{V}_2$ is given by Eq. (9):

$$\hat{V}_2 = \begin{bmatrix} a_{0,0} & a_{0,1} \\ a_{1,0} & a_{1,1} \\ a_{2,0} & a_{2,1} \\ a_{3,0} & a_{3,1} \\ a_{4,0} & a_{4,1} \\ a_{5,0} & a_{5,1} \\ a_{6,0} & a_{6,1} \\ a_{7,0} & a_{7,1} \end{bmatrix} / \sqrt{2} \quad (9)$$

In Eq. (9), the values in the precoder matrix $\hat{V}_2$ are complex numbers that each have an amplitude and phase given by Eq. (10):

$$a_{i,j} = \alpha_{i,j} e^{j\mu_{i,j}}, \ 0 \leq i \leq 7, \ 0 \leq j \leq 1, \ 0 \leq \alpha_{i,j} \leq 1 \quad (10)$$

Right-multiplying both sides of Eq. (9) with a diagonal matrix yields Eq. (11):

$$\hat{V}_2 = \hat{V}_2 \begin{bmatrix} e^{-j\mu_{7,0}} & 0 \\ 0 & e^{-j\mu_{7,1}} \end{bmatrix} = \begin{bmatrix} b_{0,0} & b_{0,1} \\ b_{1,0} & b_{1,1} \\ b_{2,0} & b_{2,1} \\ b_{3,0} & b_{3,1} \\ b_{4,0} & b_{4,1} \\ b_{5,0} & b_{5,1} \\ b_{6,0} & b_{6,1} \\ a_{7,0} & a_{7,1} \end{bmatrix} \quad (11)$$

In Eq. (11), values $b_{i,j}$ are given by Eq. (12):

$$b_{i,j} = a_{i,j} e^{-j\mu_{7,j}} = \alpha_{i,j} e^{j\delta_{i,j}}, \ 0 \leq i \leq 6, \ 0 \leq j \leq 1 \quad (12)$$

The right-multiplication above may change the last element of both columns to a non-negative real number without changing the orthogonality between two columns.

Left-multiplying both sides of Eq. (11) with a square diagonal matrix may change the elements of the first column from complex number to non-negative real number. The square diagonal matrix may be expanded from one vector as Eq. (13):

$$D_0 = \text{diag}([e^{j\delta_{0,0}} e^{j\delta_{1,0}} e^{j\delta_{2,0}} e^{j\delta_{3,0}} e^{j\delta_{4,0}} e^{j\delta_{5,0}} e^{j\delta_{6,0}} 1]) \quad (13)$$

After the left-multiplication above, the precoder matrix $\hat{V}_2$ may be represented as Eq. (14):

$$\hat{V}_2 = D_0 \hat{V}_2 = \begin{bmatrix} \alpha_{0,0} & c_{0,1} \\ \alpha_{1,0} & c_{1,1} \\ \alpha_{2,0} & c_{2,1} \\ \alpha_{3,0} & c_{3,1} \\ \alpha_{4,0} & c_{4,1} \\ \alpha_{5,0} & c_{5,1} \\ \alpha_{6,0} & c_{6,1} \\ \alpha_{7,0} & \alpha_{7,1} \end{bmatrix} \quad (14)$$

Rotating the precoder matrix $\hat{V}_2$, via a Givens rotation, may the place the first column in the form of a unit vector. Applying a Givens rotation involves multiplying the precoder matrix $\hat{V}_2$ by a Givens rotation matrix, as in Eq. (15):

$$G_k = \begin{bmatrix} \cos(\phi_k) & \sin(\phi_k) \\ -\sin(\phi_k) & \cos(\phi_k) \end{bmatrix} \quad (15)$$

In Eq. (15), angle $\phi_k$ is given by Eq. (16):

$$\phi_k = a\cos\left(\alpha_{0,0} / \sqrt{\alpha_{0,0}^2 + \alpha_{k,0}^2}\right) \quad (16)$$

In some examples, parameter $\alpha_{0,0}$ may vary with each rotation. The rotation matrix affects a submatrix of precoder matrix $\hat{V}_2$ at row 0 and k+1.

After seven Givens rotation matrices are applied, the precoder matrix $\hat{V}_2$ is given by Eq. (17):

$$\hat{V}_2 = \begin{bmatrix} 1 & 0 \\ 0 & 1 \\ 0 & d_{2,1} \\ 0 & d_{3,1} \\ 0 & d_{4,1} \\ 0 & d_{5,1} \\ 0 & d_{6,1} \\ 0 & d_{7,1} \end{bmatrix} \quad (17)$$

where $d_{i,1} = \alpha_{i,1} e^{j\gamma i}$, $2 \leq i \leq 7$. Repeating Eqs. (13) through (17) for the last six elements of the second column reduce the precoder matrix $\hat{V}_2$ to Eq. (18):

$$\hat{V}_2 = \begin{bmatrix} 1 & 0 \\ 0 & 1 \\ 0 & 0 \\ 0 & 0 \\ 0 & 0 \\ 0 & 0 \\ 0 & 0 \\ 0 & 0 \end{bmatrix} \quad (18)$$

In some examples, applying Eqs. (13) to (18) as discussed above may quantize the rank r=2 precoder matrix $\hat{V}_2$ into 26 values of phase $\emptyset$. In some examples, the first half (e.g., 13) of the phases $\emptyset$ may be used in the square diagonal matrix $D_0$ to rotate each element from complex number to non-negative real number. In some examples, the first half of the phases Ø may be evenly distributed in a range between 0 and 2*pi. In some examples, each phase Ø may use $N_p$ bits to quantize, as in Eq. (19):

$$\hat{\varphi}_m = (\lfloor \varphi_m/(2\pi/2^{N_p}) \rfloor + 0.5)\frac{2\pi}{2^{N_p}} \quad (19)$$

In some examples, the second half (e.g., remaining 13) of the phases Ø may be the rotation angles used in the Givens rotation matrix $G_k$ from Eq. (15). The first 7 of these phases Ø may be used for the first column of the precoder matrix $\hat{V}_2$ and the remaining 6 may be used for the second column of the precoder matrix $\hat{V}_2$.

Figure 2:
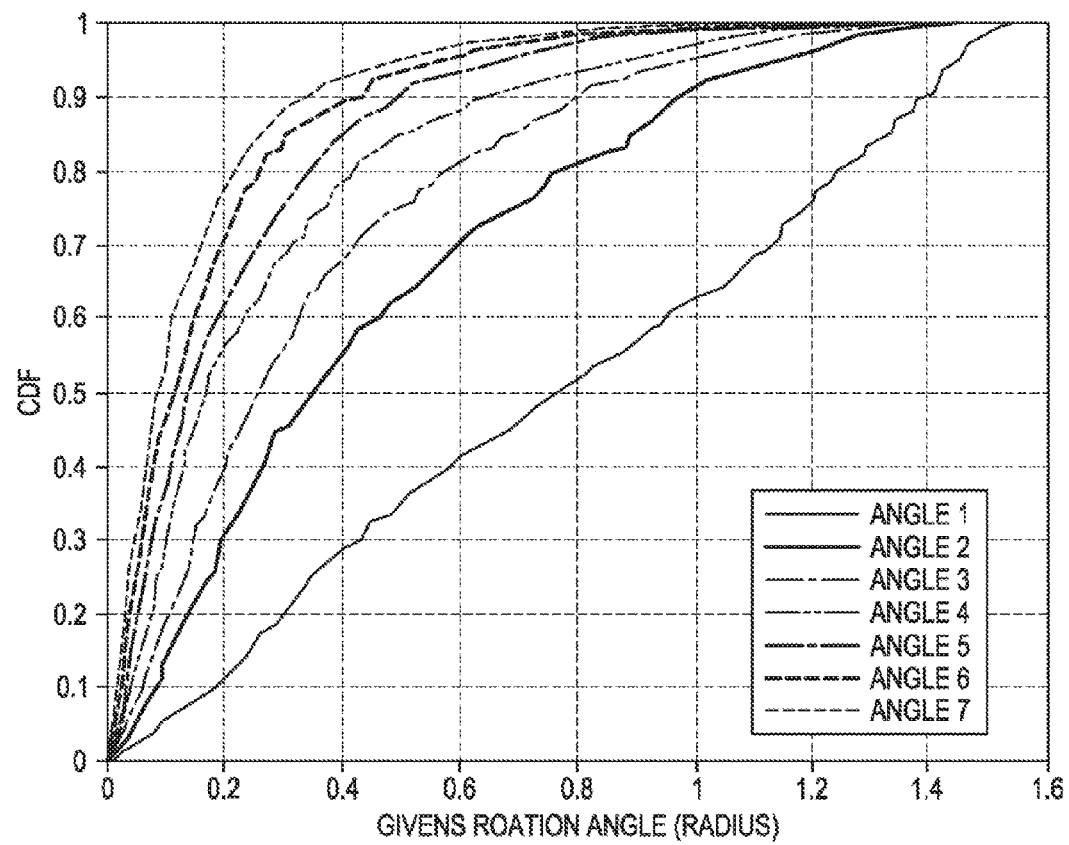
FIG. 2 shows plots of cumulative distribution function (CDF) of the first 7 Givens rotation angles, in accordance with some embodiments.

FIG. 2 shows plots of cumulative distribution function (CDF) of the first 7 Givens rotation angles, in accordance with some embodiments. The valid range of Givens rotation angles is between 0 and pi/2. FIG. 2 shows that as the precoder is rotated iteratively, the distribution of the Givens angle becomes non-evenly distributed and more concentrated to small values. In some examples, this small-value concentration may be used to either the quantization accuracy. For example, even quantization may be applied to Eq. (18) in a reduced angular range extending from 0 to pi/2. In some examples, this small-value concentration may be used to reduce the quantization overhead. For example, the CDF curves in FIG. 2 may quantize each phase into $N_s$ bits, as in Eq. (20):

$$\hat{\varphi}_m = F^{-1}\left((\lfloor F(\varphi_m)/(1/2^{N_s}) \rfloor + 0.5)\frac{1}{2^{N_s}}\right) \quad (20)$$

In FIG. 2 and Eq. (20), the cumulative distribution function (CDF) is given by Eq. (21):

$$F(\phi_m) = P\{x < \phi_m\} \quad (21)$$

The Appendix provides numerical values for each curve shown in FIG. 2.

With the 26 quantized angles, the eNB may fully recover a rank two precoder. In some examples, the quantization technique discussed above may be inserted in section 7.2.4 of specification document TS36.213 (E-UTRA) physical layer procedures.

As an alternative to the Givens rotation technique discussed above, a second quantization technique is discussed presently. This second quantization technique uses an 8-by-2 unitary matrix as an example. This second quantization technique repeats the notations and operations of Eqs. (9) through (14). The complex, unitary, beamforming matrix under quantization is first converted to a non-negative matrix using Eqs. (9) through (14).

The first column of a precoder matrix $\hat{V}_2$ of rank r=2 is given by Eq. (22):

$$v_0 = \begin{bmatrix} \alpha_{0,0} \\ \alpha_{1,0} \\ \alpha_{2,0} \\ \alpha_{3,0} \\ \alpha_{4,0} \\ \alpha_{5,0} \\ \alpha_{6,0} \\ \alpha_{7,0} \end{bmatrix} \quad (22)$$

The column may be divided into two groups with the same number or about the same number of entries, as in Eqs. (23) and (24):

$$a_{4,0} = \begin{bmatrix} \alpha_{0,0} \\ \alpha_{1,0} \\ \alpha_{2,0} \\ \alpha_{3,0} \end{bmatrix} \quad (23)$$

$$b_{4,0} = \begin{bmatrix} \alpha_{4,0} \\ \alpha_{5,0} \\ \alpha_{6,0} \\ \alpha_{7,0} \end{bmatrix} \quad (24)$$

Note that for an even number of rows, the two groups can have the same number of entries. For an odd number of rows, one group may have one more entry than the other group. Ratio γ may be defined between groups a and b, as in Eq. (25):

$$\gamma = \frac{f(a) - f(b)}{f(a) + f(b)} \quad (25)$$

In Eq. (25), function $f(x)$ may represent the magnitude of the vector or scalar x and may be defined by Eq. (26) using square norm or by Eq. (27) for absolute value norm:

$$f(x) = |x|^2 \quad (26)$$

$$f(x) = |x_0| + |x_1| + \ldots + |x_N| \quad (27)$$

From ratio γ, the ratio between $f(a)$ and $f(b)$ may be computed as in Eq. (28):

$$\frac{f(a)}{f(b)} = \frac{1+\gamma}{1-\gamma} \quad (28)$$

Using the square of vector norm $|x|^2$ for Eq. (23) and (24) gives Eq. (29):

$$\gamma_{4,0} = \frac{|a_{4,0}|^2 - |b_{4,0}|^2}{|a_{4,0}|^2 + |b_{4,0}|^2} \quad (29)$$

Similarly, we may recursively divide $a_{4,0}$ (and $b_{4,0}$) into two subgroups and define the ratio between the two subgroups as Eqs. (30) through (35):

$$a_{2,0} = \begin{bmatrix} \alpha_{0,0} \\ \alpha_{1,0} \end{bmatrix}, b_{2,0} = \begin{bmatrix} \alpha_{2,0} \\ \alpha_{3,0} \end{bmatrix}, \text{ and } \gamma_{2,0} = \frac{|a_{2,0}|^2 - |b_{2,0}|^2}{|a_{2,0}|^2 + |b_{2,0}|^2} \quad (30)$$

$$a_{2,1} = \begin{bmatrix} \alpha_{4,0} \\ \alpha_{5,0} \end{bmatrix}, b_{2,1} = \begin{bmatrix} \alpha_{6,0} \\ \alpha_{7,0} \end{bmatrix}, \text{ and } \gamma_{2,1} = \frac{|a_{2,1}|^2 - |b_{2,1}|^2}{|a_{2,1}|^2 + |b_{2,1}|^2} \quad (31)$$

$$a_{1,0} = \alpha_{0,0}, b_{1,0} = \alpha_{1,0}, \text{ and } \gamma_{1,0} = \frac{|a_{1,0}|^2 - |b_{1,0}|^2}{|a_{1,0}|^2 + |b_{1,0}|^2} \quad (32)$$

$$a_{1,1} = \alpha_{2,0}, b_{1,1} = \alpha_{3,0}, \text{ and } \gamma_{1,1} = \frac{|a_{1,1}|^2 - |b_{1,1}|^2}{|a_{1,1}|^2 + |b_{1,1}|^2} \quad (33)$$

$$a_{1,2} = \alpha_{4,0}, b_{1,2} = \alpha_{5,0}, \text{ and } \gamma_{1,2} = \frac{|a_{1,2}|^2 - |b_{1,2}|^2}{|a_{1,2}|^2 + |b_{1,2}|^2} \quad (34)$$

$$a_{1,3} = \alpha_{6,0}, b_{1,3} = \alpha_{7,0}, \text{ and } \gamma_{1,3} = \frac{|a_{1,3}|^2 - |b_{1,3}|^2}{|a_{1,3}|^2 + |b_{1,3}|^2} \quad (35)$$

Figure 3:
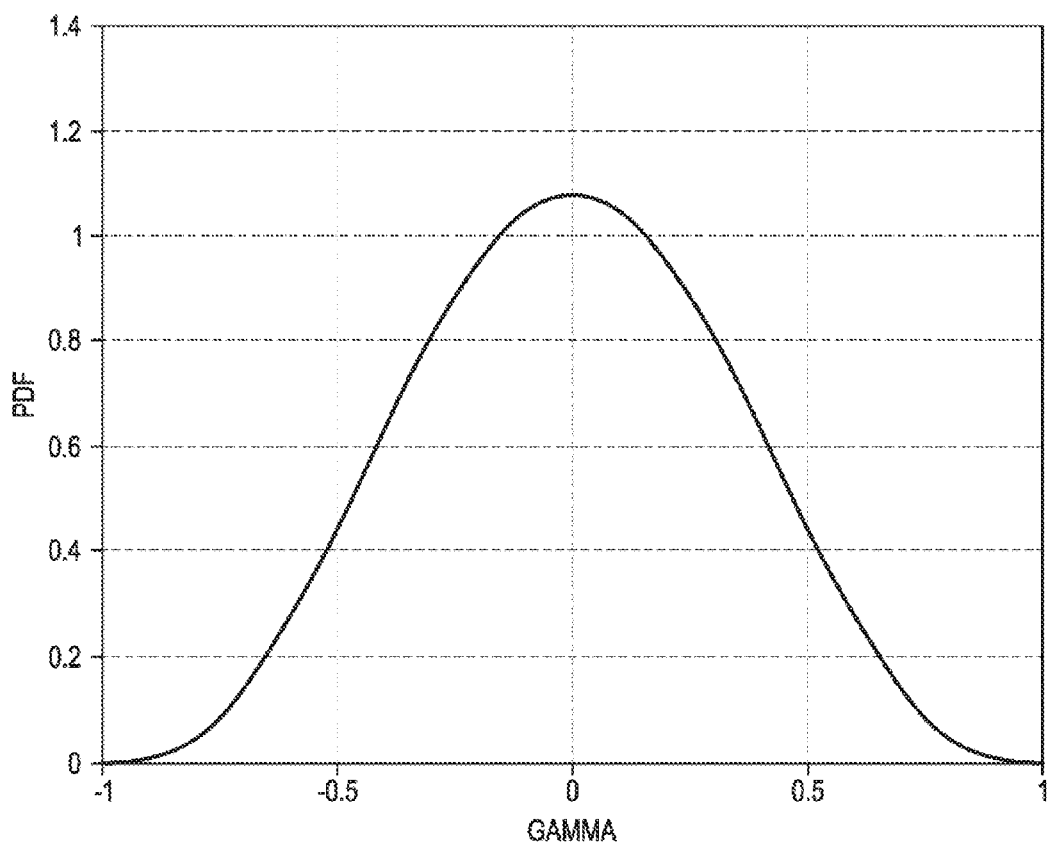
FIG. 3 shows a plot of probability density function for $\gamma_{4,0}$ for a complex 8-by-1 beamforming vector in an independent and identically distributed (i.i.d.) channel, in accordance with some embodiments.

FIG. 3 shows a plot of probability density function for $\gamma_{4,0}$ for a complex 8-by-1 beamforming vector in an independent and identically distributed (i.i.d.) channel, in accordance with some embodiments.

Figure 4:
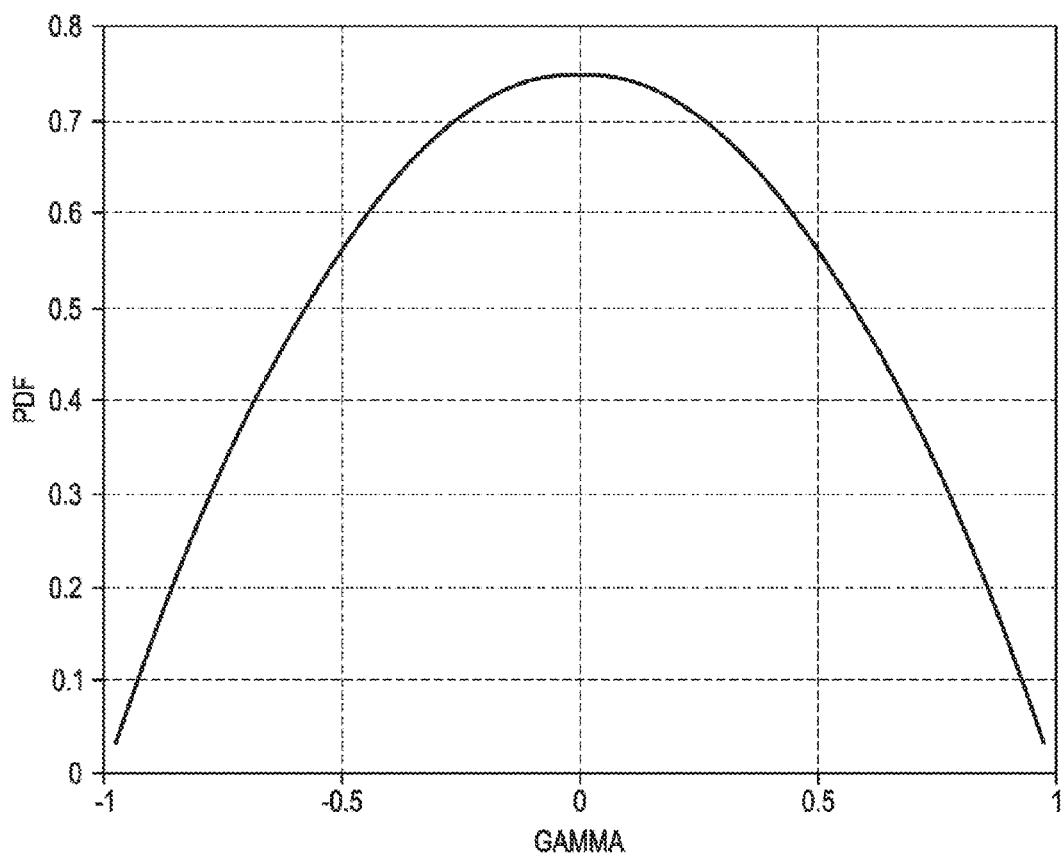
FIG. 4 shows a plot of probability density function for $\gamma_{2,i}$ for a complex 8-by-1 beamforming vector in an independent and identically distributed (i.i.d.) channel, in accordance with some embodiments.

FIG. 4 shows a plot of probability density function for $\gamma_{2,i}$ for a complex 8-by-1 beamforming vector in an independent and identically distributed (i.i.d.) channel, in accordance with some embodiments. In FIG. 4, i=0, 1.

Figure 5:
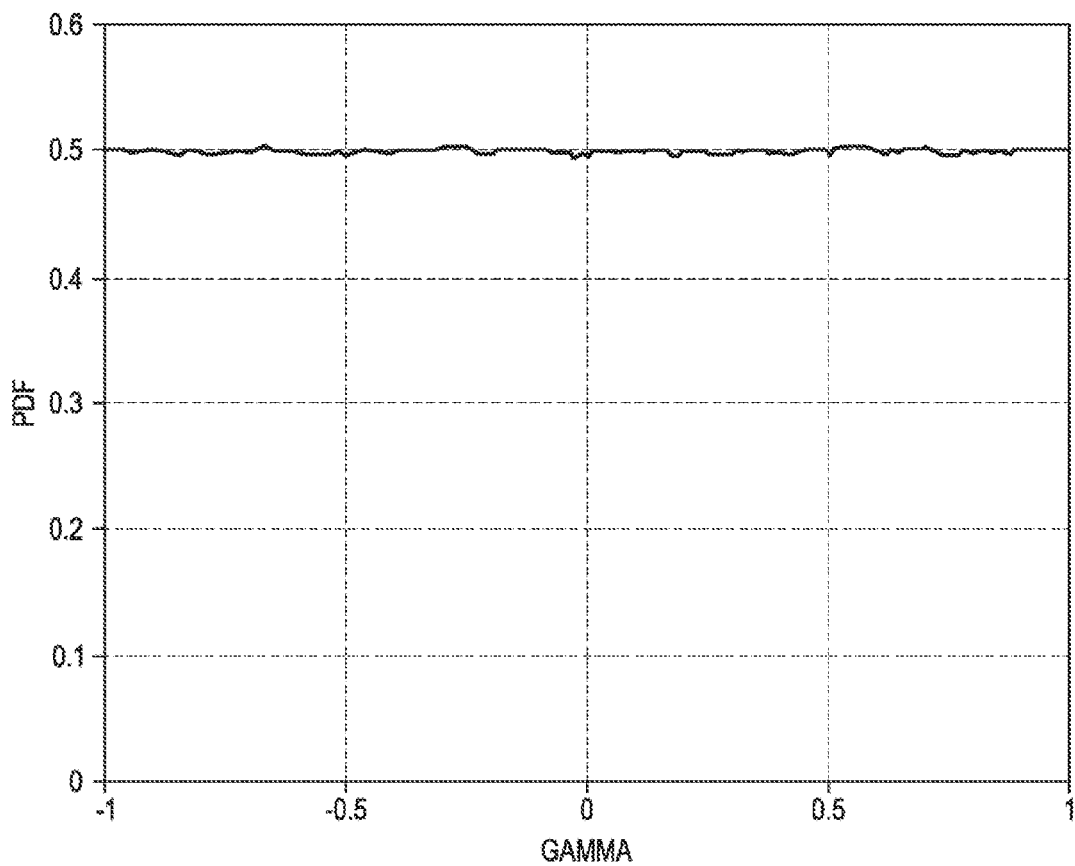
FIG. 5 shows a plot of probability density function for $\gamma_{1,j}$ for a complex 8-by-1 beamforming vector in an independent and identically distributed (i.i.d.) channel, in accordance with some embodiments.

FIG. 5 shows a plot of probability density function for $\gamma_{i,j}$ for a complex 8-by-1 beamforming vector in an independent and identically distributed (i.i.d.) channel, in accordance with some embodiments. In FIG. 5, j=0, 1, 2, 3.

The ratios $\gamma$, such as those shown in FIGS. 3-5, may be quantized. The magnitudes of the beamforming vector may be reconstructed from the quantized ratios as in Eqs. (36) through (43):

$$\hat{\alpha}_{0,0} = f^{-1}((1+\hat{\gamma}_{4,0})(1+\hat{\gamma}_{2,0})(1+\hat{\gamma}_{1,0})) \quad (36)$$

$$\hat{\alpha}_{1,0} = f^{-1}((1+\hat{\gamma}_{4,0})(1+\hat{\gamma}_{2,0})(1-\hat{\gamma}_{1,0})) \quad (37)$$

$$\hat{\alpha}_{2,0} = f^{-1}((1+\hat{\gamma}_{4,0})(1-\hat{\gamma}_{2,0})(1+\hat{\gamma}_{1,1})) \quad (38)$$

$$\hat{\alpha}_{3,0} = f^{-1}((1+\hat{\gamma}_{4,0})(1-\hat{\gamma}_{2,0})(1-\hat{\gamma}_{1,1})) \quad (39)$$

$$\hat{\alpha}_{4,0} = f^{-1}((1-\hat{\gamma}_{4,0})(1+\hat{\gamma}_{2,1})(1+\hat{\gamma}_{1,2})) \quad (40)$$

$$\hat{\alpha}_{5,0} = f^{-1}((1-\hat{\gamma}_{4,0})(1+\hat{\gamma}_{2,1})(1-\hat{\gamma}_{1,2})) \quad (41)$$

$$\hat{\alpha}_{6,0} = f^{-1}((1-\hat{\gamma}_{4,0})(1-\hat{\gamma}_{2,1})(1+\hat{\gamma}_{1,3})) \quad (42)$$

$$\hat{\alpha}_{7,0} = f^{-1}((1-\hat{\gamma}_{4,0})(1-\hat{\gamma}_{2,1})(1-\hat{\gamma}_{1,3})) \quad (43)$$

For $f(x)=|x|^2$, $f^{-1}(x)=\sqrt{x}$. The reconstructed beamforming vector may have an ambiguity about the column phase and the magnitude, which does not affect the beamforming performance. After the first column is quantized, the quantized column may be used to rotate the second column in an 8-by-2 beamforming matrix such that a 7-by-1 vector is obtained for the quantization of the second column. The quantization of the 7-by-1 vector may be quantized in a manner similar to the one for the 8-by-1 vector, by dividing the entries into two groups recursively and quantize the ratio between the two groups.

Consider the following example. For this example, an eNB antenna array has 64 antenna elements. A 64-by-8 matrix may virtualize 64 antenna elements to 8 antenna ports. If the quantized rank one eigen beam is $[0.1, 0.2, 0.3j, 0, 0, 0, 0, 0]^T$, then a particular data layer may be transmitted from the first three antenna ports with weight 0.1, 0.2, and 0.3j, respectively. A CSI-RS may be sent from the eNB. In this example, the CSI-RS has 8 ports. The UE sends CSI back to the eNB via the uplink channels PUCCH (Physical Uplink Control Channel) or PUSCH (Physical Uplink Shared Channel). This is but one example; other suitable examples may also be used.

Figure 6:
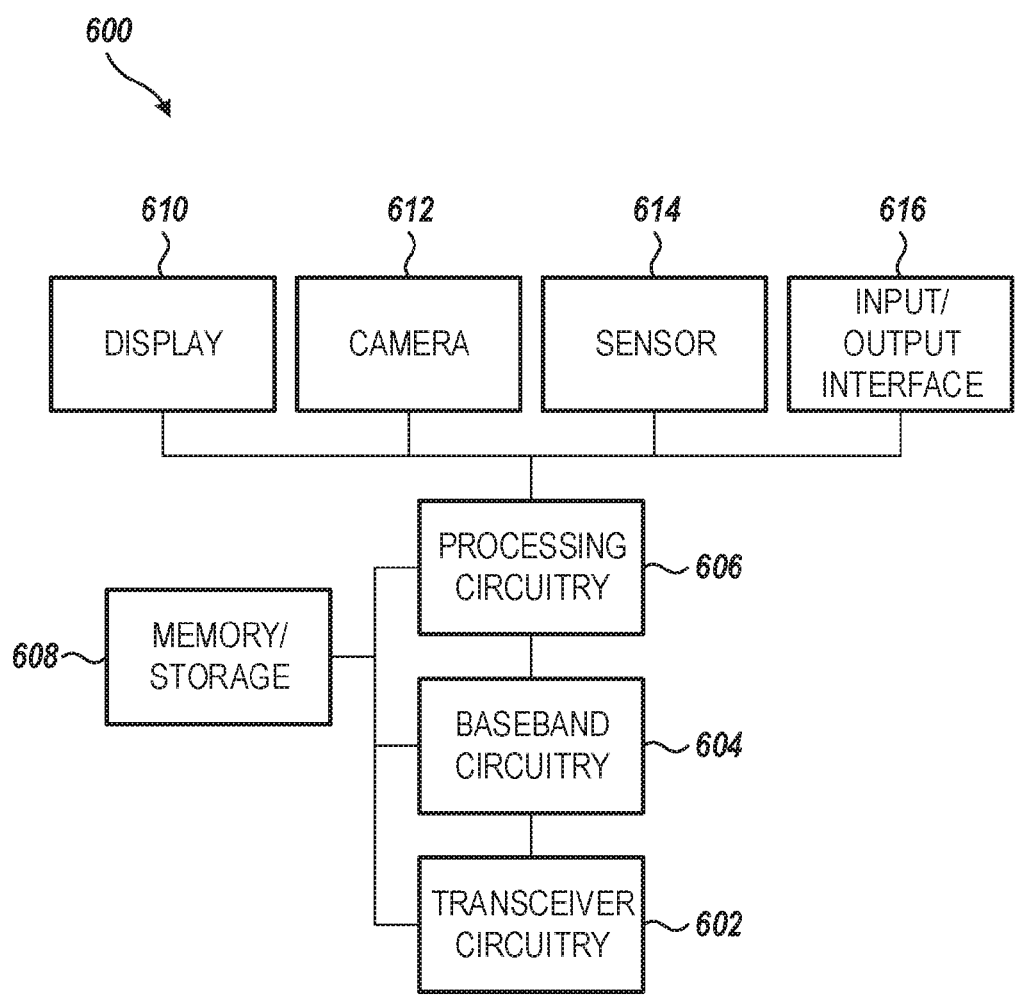
FIG. 6 shows an example system, in accordance with some embodiments.

Embodiments described herein may be implemented into a system using any suitable configured hardware and/or software. FIG. 6 shows, for one embodiment, an example system 600 that includes transceiver circuitry 602, baseband circuitry 604, processing circuitry 606, memory/storage 608, display 610, camera 612, sensor 614, and input/output (I/O) interface 616, coupled with each other at least as shown.

The processing circuitry 606 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 608 and arranged to execute instructions stored in the memory/storage 608 to enable various applications and/or operating systems running on the system 600.

The baseband circuitry 604 may include circuitry such as, but not limited to, one or more single-core or multi-core processors. The processor(s) may include a baseband processor. The baseband circuitry 604 may handle various radio control functions that allows for communication with one or more radio networks via the transceiver circuitry 602. The radio control functions may include, but are not limited to, signal modulation, encoding, decoding, radio frequency shifting, etc. In some embodiments, the baseband circuitry 604 may provide for communication compatible with one or more radio technologies. For example, in some embodiments, the baseband circuitry 604 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 604 is arranged to support radio communications of more than one wireless protocol may be referred to as multi-mode baseband circuitry.

In various embodiments, baseband circuitry 604 may include circuitry to operate with signals that are not strictly considered as being in a baseband frequency. For example, in some embodiments, baseband circuitry 604 may include circuitry to operate with signals having an intermediate frequency, which is between a baseband frequency and a radio frequency.

Transceiver circuitry 602 may enable communication with wireless networks using modulated electromagnetic radiation through a non-solid medium. In various embodiments, the transceiver circuitry 602 may include switches, filters, amplifiers, etc. to facilitate the communication with the wireless network.

In various embodiments, transceiver circuitry 602 may include circuitry to operate with signals that are not strictly considered as being in a radio frequency. For example, in some embodiments, transceiver circuitry 602 may include circuitry to operate with signals having an intermediate frequency, which is between a baseband frequency and a radio frequency.

In various embodiments, the derivation logic, quantization logic, and communication logic discussed herein with respect to the UE (and shown in FIG. 7 below) may be embodied in whole or in part in one or more of the transceiver circuitry 602, the baseband circuitry 604, and/or the processing circuitry 606. As used herein, the term circuitry may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry 604, the processing circuitry 606, and/or the memory/storage 608 may be implemented together on a system on a chip (SOC).

Memory/storage 608 may be used to load and store data and/or instructions, for example, for system 600. Memory/storage 608 for one embodiment may include any combination of suitable volatile memory (e.g., dynamic random access memory (DRAM)) and/or non-volatile memory (e.g., Flash memory).

In various embodiments, the I/O interface 616 may include one or more user interfaces designed to enable user interaction with the system 600 and/or peripheral component interfaces designed to enable peripheral component interaction with the system 600. User interfaces may include, but are not limited to a physical keyboard or keypad, a touchpad, a speaker, a microphone, etc. Peripheral component interfaces may include, but are not limited to, a nonvolatile memory port, a universal serial bus (USB) port, an audio jack, and a power supply interface.

In various embodiments sensor 614 may include one or more sensing devices to determine environmental conditions and/or location information related to the system 600. In some embodiments, the sensors 614 may include, but are not limited to, a gyro sensor, an accelerometer, a proximity sensor, an ambient light sensor, and a positioning unit. The positioning unit may also be part of, or interact with, the baseband circuitry and/or transceiver circuitry to communicate with components of a positioning network, e.g., a global positioning system (GPS) satellite.

In various embodiments, the display 610 may include a display (e.g., a liquid crystal display, a touch screen display, etc.).

In various embodiments, the system 600 may be a mobile computing device such as, but not limited to, a laptop computing device, a tablet computing device, a netbook, an ultrabook, a smartphone, etc. In various embodiments, system may have more or fewer components, and/or different architectures.

Figure 7:
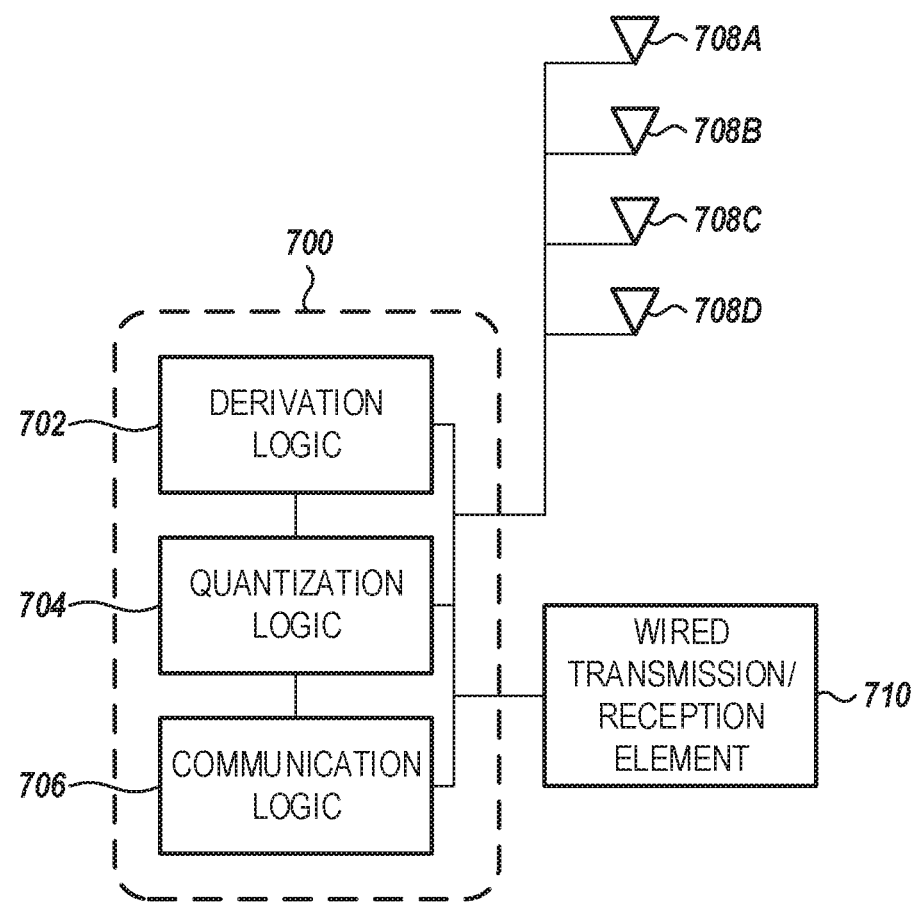
FIG. 7 shows an example of computer circuitry that may be used to communicate channel state information in a cellular network, in accordance with some embodiments.

FIG. 7 shows an example of computer circuitry 700, such as in user equipment, that may be used to communicate channel state information in a cellular network. In some examples, the computer circuitry 700 may include derivation logic 702 and quantization logic 704 coupled to communication logic 706. The computer circuitry 700 may be coupled with one or more plurality of antenna elements 708A-D of one or more antennas or one or more wired transmission/reception elements 710. The computer circuitry 700 and/or the components of the computer circuitry 700 may be arranged to perform operations similar to those described elsewhere in this disclosure.

Specifically, the wired transmission/reception elements 710 may be arranged to receive a plurality of orthogonal frequency division multiple access (OFDMA) signals. The derivation logic 702 may be arranged to derive one or more principal eigen beams through measurement of the plurality of OFDMA signals. The quantization logic 704 may be arranged to quantize principal eigen beams having a rank greater than or equal to one. The communication logic 706 may be arranged to communicate, to an eNB, a bit pattern of the recommended eigen beams and the wideband and/or subband channel quality indicator (CQI) conditioned on the quantized eigen beam. The wired transmission/reception elements 710 may be further arranged to receive data sent from the eNB's antenna elements using the precoder calculated from its principal eigen beams.

As used herein, the term logic may refer to, be part of, or include circuitry, such as an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. Thus, as used herein logic may also include software and/or firmware modules which may be operated on my one or more computer processors of the apparatus to provide the described functionality.

Figure 8:
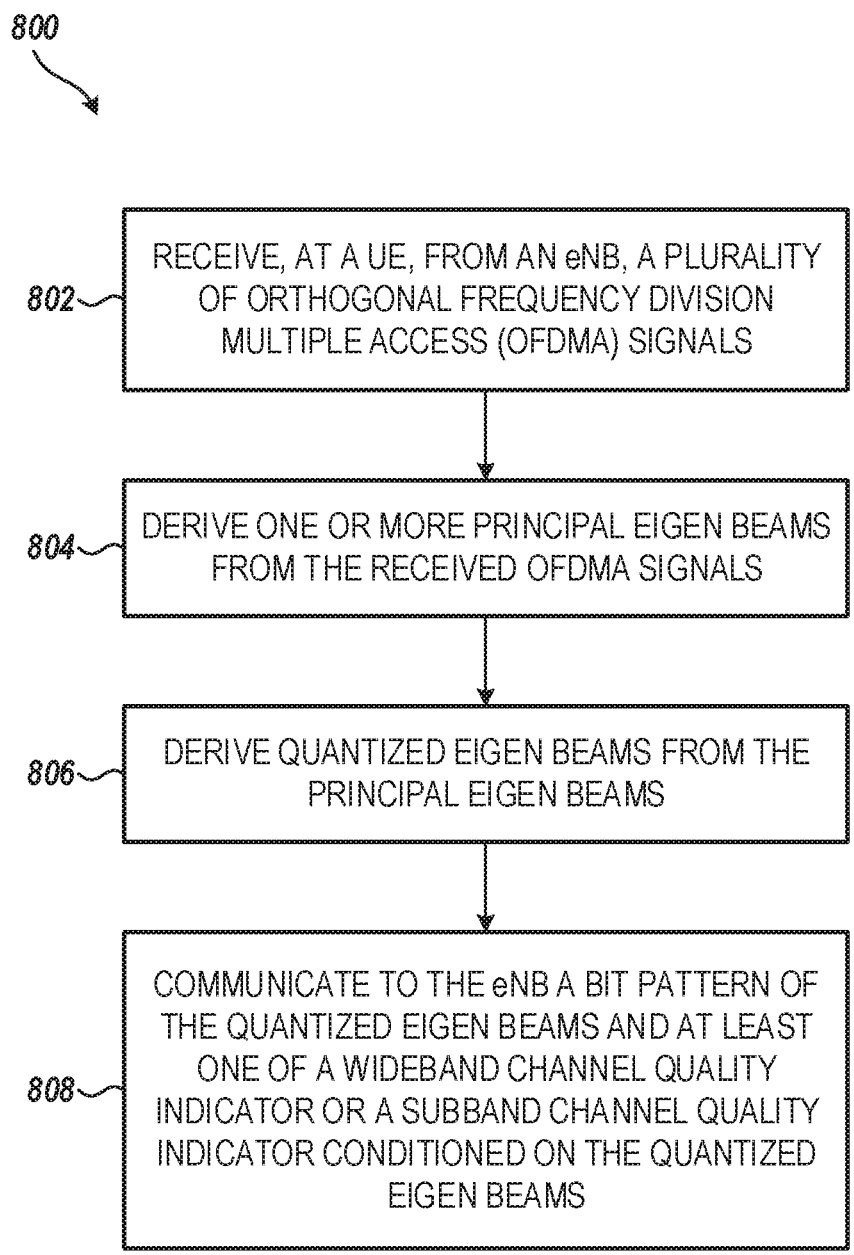
FIG. 8 shows an example of a method that may be executed by computer circuitry, in accordance with some embodiments.

FIG. 8 shows an example of a method 800 that may be executed by computer circuitry, such as 602, 604, 606 (FIG. 6), and/or 700 (FIG. 7), in accordance with some embodiments.

At operation 802, transceiver circuitry may receive, at the UE, from an eNB, a plurality of orthogonal frequency division multiple access (OFDMA) signals.

At operation 804, processing circuitry may derive one or more principal eigen beams from the received OFDMA signals. The principal eigen beams may have a rank greater than or equal to one.

At operation 806, the processing circuitry may derive quantized eigen beams from the principal eigen beams.

At operation 808, the transceiver circuitry may communicate to the eNB, via a Channel State Information Reference Signal (CSI-RS), a bit pattern of the quantized eigen beams and at least one of a wideband channel quality indicator (CQI) or a subband CQI conditioned on the quantized eigen beams.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a user equipment (UE) operable to communicate channel state information in a wireless network, the UE comprising: transceiver circuitry arranged to receive, at the UE, from an Enhanced node B (eNB), a plurality of orthogonal frequency division multiple access (OFDMA) signals; processing circuitry arranged to derive one or more principal eigen beams from the received OFDMA signals, the principal eigen beams having a rank greater than or equal to one, the processing circuitry arranged to derive quantized eigen beams from the principal eigen beams, the processing circuitry further arranged to select, in response to the quantized eigen beams, a subset of available antenna ports on the eNB for receiving from the eNB and transmitting to the eNB; and the transceiver circuitry arranged to communicate to the eNB, via a Channel State Information Reference Signal (CSI-RS), a bit pattern of the quantized eigen beams and at least one of a wideband channel quality indicator (CQI) or a subband CQI conditioned on the quantized eigen beams.

In Example 2, the subject matter of Example 1 may optionally include wherein the transceiver circuitry is further arranged to select, in response to the quantized eigen beams, a subset of available antenna ports on the eNB for receiving from the eNB and transmitting to the eNB.

In Example 3, the subject matter of any one of Examples 1-2 may optionally include wherein the processing circuitry is further arranged to calculate, in response to the quantized eigen beams, a plurality of phase values and a plurality of amplitude values, each amplitude and phase value corresponding to a respective antenna port in the subset of available antenna ports, each amplitude value corresponding to a signal amplification factor, each phase value corresponding to a signal phase delay.

In Example 4, the subject matter of any one of Examples 1-3 may optionally include wherein the processing circuitry uses a Givens rotation to quantize antenna ports numbering Nc for the principal eigen beams.

In Example 5, the subject matter of any one of Examples 1-4 may optionally include wherein the processing circuitry further quantizes a precoder of rank r into phases numbering $2*\Sigma_{k=0}^{r}(Nc-k-1)$, where Nc is a number of antenna ports on the UE.

In Example 6, the subject matter of any one of Examples 1-5 may optionally include wherein the processing circuitry evenly quantizes a first half of the phases to have Np bits per phase, where Np is a number of layers; and wherein the processing circuitry unevenly quantizes a second half of the phases to have Ns bits per phase.

In Example 7, the subject matter of any one of Examples 1-6 may optionally include wherein the processing circuitry uses the first half of the phases to rotate each element of the precoder from a complex number to a nonnegative real number; and wherein the processing circuitry uses the second half of the phases to rotate the precoder to an identity matrix.

In Example 8, the subject matter of any one of Examples 1-7 may optionally include wherein the processing circuitry quantizes each phase, of the first half of the phases, evenly in the range between 0 and 2*pi; and wherein the processing circuitry quantizes each phase, of the first half of the phases, according to the equation $$D_0 = \text{diag}([e^{j\delta_{0,0}} e^{j\delta_{1,0}} e^{j\delta_{2,0}} e^{j\delta_{3,0}} e^{j\delta_{4,0}} e^{j\delta_{5,0}} e^{j\delta_{6,0}} 1]).$$

In Example 9, the subject matter of any one of Examples 1-8 may optionally include wherein the processing circuitry quantizes each phase, of the second half of the phases, in the range between 0 and 2*pi using a cumulative distribution function (CDF).

In Example 10, the subject matter of any one of Examples 1-9 may optionally include wherein the processing circuitry maps each phase, of the second half of the phases, to the CDF; wherein the processing circuitry evenly quantizes a phase probability in a range between 0 and 1 to form a quantized probability; wherein the processing circuitry maps the quantized probability using an inverse of the CDF to a quantized phase; and wherein the processing circuitry sequentially quantizes phases of each column of the CDF.

In Example 11, the subject matter of any one of Examples 1-10 may optionally include wherein the processing circuitry further quantizes a precoder of rank r into phases and ratios, the phases and ratios both numbering $2*\Sigma_{k=0}^{r}(Nc-k-1)$, where Nc is a number of antenna ports on the UE.

In Example 12, the subject matter of any one of Examples 1-11 may optionally include wherein the processing circuitry further quantizes the ratios according to the equations $$a_{2,0} = \begin{bmatrix} \alpha_{0,0} \\ \alpha_{1,0} \end{bmatrix}, b_{2,0} = \begin{bmatrix} \alpha_{2,0} \\ \alpha_{3,0} \end{bmatrix}, \text{ and } \gamma_{2,0} = \frac{|a_{2,0}|^2 - |b_{2,0}|^2}{|a_{2,0}|^2 + |b_{2,0}|^2};$$

$$a_{2,1} = \begin{bmatrix} \alpha_{4,0} \\ \alpha_{5,0} \end{bmatrix}, b_{2,1} = \begin{bmatrix} \alpha_{6,0} \\ \alpha_{7,0} \end{bmatrix}, \text{ and } \gamma_{2,1} = \frac{|a_{2,1}|^2 - |b_{2,1}|^2}{|a_{2,1}|^2 + |b_{2,1}|^2};$$

$$a_{1,0} = \alpha_{0,0}, b_{1,0} = \alpha_{1,0}, \text{ and } \gamma_{1,0} = \frac{|a_{1,0}|^2 - |b_{1,0}|^2}{|a_{1,0}|^2 + |b_{1,0}|^2};$$

$$a_{1,1} = \alpha_{2,0}, b_{1,1} = \alpha_{3,0}, \text{ and } \gamma_{1,1} = \frac{|a_{1,1}|^2 - |b_{1,1}|^2}{|a_{1,1}|^2 + |b_{1,1}|^2};$$

$$a_{1,2} = \alpha_{4,0}, b_{1,2} = \alpha_{5,0}, \text{ and } \gamma_{1,2} = \frac{|a_{1,2}|^2 - |b_{1,2}|^2}{|a_{1,2}|^2 + |b_{1,2}|^2};$$

and $$a_{1,3} = \alpha_{6,0}, b_{1,3} = \alpha_{7,0}, \text{ and } \gamma_{1,3} = \frac{|a_{1,3}|^2 - |b_{1,3}|^2}{|a_{1,3}|^2 + |b_{1,3}|^2}.$$

In Example 13, the subject matter of any one of Examples 1-12 may optionally include wherein the transceiver circuitry further receives data sent from antenna elements of the eNB using a precoder calculated from the principal eigen beams; and wherein each received OFDMA signal is transmitted with an independent beamforming pattern from an antenna array of the eNB.

In Example 14, the subject matter of any one of Examples 1-13 may optionally include wherein the transceiver circuitry is coupled to at least one antenna.

Example 15 is a method for communicating channel state information from a user equipment (UE) to an Enhanced node B (eNB) in a wireless network, the method comprising: deriving, at the UE, one or more principal eigen beams from received orthogonal frequency division multiple access (OFDMA) signals, the principal eigen beams having a rank greater than or equal to one; deriving, at the UE, quantized eigen beams from the principal eigen beams; and selecting, at the UE, in response to the quantized eigen beams, a subset of available antenna ports on the eNB for receiving from the eNB and transmitting to the eNB; and wherein the UE uses a Givens rotation to quantize antenna ports numbering Nc for the principal eigen beams.

In Example 16, the subject matter of Example 15 may optionally include communicating, from the UE to the eNB, via a Channel State Information Reference Signal (CSI-RS), a bit pattern of the quantized eigen beams and at least one of a wideband channel quality indicator (CQI) or a subband CQI conditioned on the quantized eigen beams.

In Example 17, the subject matter of any one of Examples 15-16 may optionally include further comprising, at the UE: quantizing a precoder of rank r into phases numbering $2*\Sigma_{k=0}^{r}(Nc-k-1)$, where Nc is a number of antenna ports on the UE; wherein the UE evenly quantizes a first half of the phases to have Np bits per phase, where Np is a number of layers; and wherein the UE unevenly quantizes a second half of the phases to have Ns bits per phase.

In Example 18, the subject matter of any one of Examples 15-17 may optionally include wherein the UE evenly quantizes a first half of the phases to have Np bits per phase, where Np is a number of layers; wherein the UE unevenly quantizes a second half of the phases to have Ns bits per phase; wherein the UE uses the first half of the phases to rotate each element of the precoder from a complex number to a nonnegative real number; and wherein the UE uses the second half of the phases to rotate the precoder to an identity matrix.

Example 19 is a non-transitory computer-readable medium containing instructions which, when executed, perform operations to communicate channel state information from a user equipment (UE) to an Enhanced node B (eNB) in a wireless network, the operations to arrange the UE to: receive from the eNB a plurality of orthogonal frequency division multiple access (OFDMA) signals; derive one or more principal eigen beams from the received OFDMA signals, the principal eigen beams having a rank greater than or equal to one; derive quantized eigen beams from the principal eigen beams; select, in response to the quantized eigen beams, a subset of available antenna ports on the eNB for receiving from the eNB and transmitting to the eNB; and communicate, from the UE to the eNB, via a Channel State Information Reference Signal (CSI-RS), a bit pattern of the quantized eigen beams and at least one of a wideband channel quality indicator (CQI) or a subband CQI conditioned on the quantized eigen beams; wherein the operations further arrange the UE to quantize a precoder of rank r into phases and ratios, the phases and ratios both numbering $2*\Sigma_{k=0}^{r}(Nc-k-1)$, where Nc is a number of antenna ports on the UE.

In Example 20, the subject matter of Example 19 may optionally include wherein the operations further arrange the UE to receive data sent from antenna elements of the eNB using a precoder calculated from the principal eigen beams; and wherein each received OFDMA signal is transmitted with an independent beamforming pattern from an antenna array of the eNB.

APPENDIX

The following are vectors that may be used to reproduce the plots shown in FIG. 2. In the notation below, x_1 are the x-values of data points on the curve for angle 1, y_1 are the y-values of data points on the curve for angle 1, x_2 are the x-values for data points on the curve for angle 2, and so forth.

double x_1[101]={0.0100, 0.0207, 0.0483, 0.0698, 0.0805, 0.0989, 0.1174, 0.1388, 0.1557, 0.1664, 0.1910, 0.1971, 0.2171, 0.2278, 0.2355, 0.2447, 0.2493, 0.2615, 0.2815, 0.2907, 0.3014, 0.3152, 0.3229, 0.3321, 0.3398, 0.3567, 0.3659, 0.3812, 0.3919, 0.4180, 0.4334, 0.4395, 0.4487, 0.4717, 0.4870, 0.5008, 0.5147, 0.5300, 0.5453, 0.5775, 0.5929, 0.6036, 0.6159, 0.6481, 0.6680, 0.6926, 0.7049, 0.7202, 0.7417, 0.7570, 0.7724, 0.7938, 0.8122, 0.8291, 0.8460, 0.8828, 0.8935, 0.9058, 0.9227, 0.9426, 0.9518, 0.9702, 0.9887, 1.0147, 1.0485, 1.0638, 1.0700, 1.0884, 1.1006, 1.1221, 1.1344, 1.1466, 1.1497, 1.1651, 1.1789, 1.1911, 1.2049, 1.2080, 1.2295, 1.2387, 1.2540, 1.2709, 1.2862, 1.2939, 1.3154, 1.3353, 1.3415, 1.3553, 1.3737, 1.3814, 1.4059, 1.4120, 1.4166, 1.4258, 1.4412, 1.4534, 1.4627, 1.4703, 1.4979, 1.5163, 1.5516};

double y_1[101]={0.0000, 0.0100, 0.0200, 0.0300, 0.0400, 0.0500, 0.0600, 0.0700, 0.0800, 0.0900, 0.1000, 0.1100, 0.1200, 0.1300, 0.1400, 0.1500, 0.1600, 0.1700, 0.1800, 0.1900, 0.2000, 0.2100, 0.2200, 0.2300, 0.2400, 0.2500, 0.2600, 0.2700, 0.2800, 0.2900, 0.3000, 0.3100, 0.3200, 0.3300, 0.3400, 0.3500, 0.3600, 0.3700, 0.3800, 0.3900, 0.4000, 0.4100, 0.4200, 0.4300, 0.4400, 0.4500, 0.4600, 0.4700, 0.4800, 0.4900, 0.5000, 0.5100, 0.5200, 0.5300, 0.5400, 0.5500, 0.5600, 0.5700, 0.5800, 0.5900, 0.6000, 0.6100, 0.6200, 0.6300, 0.6400, 0.6500, 0.6600, 0.6700, 0.6800, 0.6900, 0.7000, 0.7100, 0.7200, 0.7300, 0.7400, 0.7500, 0.7600, 0.7700, 0.7800, 0.7900, 0.8000, 0.8100, 0.8200, 0.8300, 0.8400, 0.8500, 0.8600, 0.8700, 0.8800, 0.8900, 0.9000, 0.9100, 0.9200, 0.9300, 0.9400, 0.9500, 0.9600, 0.9700, 0.9800, 0.9900, 1.0000};

double x_2[101]={0.0008, 0.0100, 0.0253, 0.0376, 0.0422, 0.0483, 0.0545, 0.0606, 0.0698, 0.0775, 0.0882, 0.0943, 0.0943, 0.0989, 0.1066, 0.1112, 0.1174, 0.1204, 0.1281, 0.1388, 0.1450, 0.1511, 0.1557, 0.1603, 0.1680, 0.1772, 0.1818, 0.1848, 0.1864, 0.1940, 0.2002, 0.2048, 0.2155, 0.2217, 0.2293, 0.2355, 0.2447, 0.2493, 0.2539, 0.2600, 0.2661, 0.2692, 0.2753, 0.2815, 0.2861, 0.3060, 0.3137, 0.3229, 0.3352, 0.3444, 0.3536, 0.3689, 0.3735, 0.3873, 0.3950, 0.4027, 0.4103, 0.4165, 0.4272, 0.4395, 0.4640, 0.4717, 0.4901, 0.5054, 0.5254, 0.5377, 0.5499, 0.5607, 0.5729, 0.5837, 0.6036, 0.6144, 0.6282, 0.6481, 0.6727, 0.6972, 0.7202, 0.7340, 0.7509, 0.7570, 0.7862, 0.8107, 0.8399, 0.8813, 0.8889, 0.9104, 0.9258, 0.9350, 0.9472, 0.9610, 0.9810, 1.0101, 1.0285, 1.0822, 1.1114, 1.1451, 1.2019, 1.2295, 1.2786, 1.3369, 1.4841};

double y_2[101]={0.0000, 0.0100, 0.0200, 0.0300, 0.0400, 0.0500, 0.0600, 0.0700, 0.0800, 0.0900, 0.1000, 0.1100, 0.1200, 0.1300, 0.1400, 0.1500, 0.1600, 0.1700, 0.1800, 0.1900, 0.2000, 0.2100, 0.2200, 0.2300, 0.2400, 0.2500, 0.2600, 0.2700, 0.2800, 0.2900, 0.3000, 0.3100, 0.3200, 0.3300, 0.3400, 0.3500, 0.3600, 0.3700, 0.3800, 0.3900, 0.4000, 0.4100, 0.4200, 0.4300, 0.4400, 0.4500, 0.4600, 0.4700, 0.4800, 0.4900, 0.5000, 0.5100, 0.5200, 0.5300, 0.5400, 0.5500, 0.5600, 0.5700, 0.5800, 0.5900, 0.6000, 0.6100, 0.6200, 0.6300, 0.6400, 0.6500, 0.6600, 0.6700, 0.6800, 0.6900, 0.7000, 0.7100, 0.7200, 0.7300, 0.7400, 0.7500, 0.7600, 0.7700, 0.7800, 0.7900, 0.8000, 0.8100, 0.8200, 0.8300, 0.8400, 0.8500, 0.8600, 0.8700, 0.8800, 0.8900, 0.9000, 0.9100, 0.9200, 0.9300, 0.9400, 0.9500, 0.9600, 0.9700, 0.9800, 0.9900, 1.0000};

double x_3[101]={0.0008, 0.0100, 0.0161, 0.0238, 0.0284, 0.0330, 0.0391, 0.0453, 0.0499, 0.0560, 0.0591, 0.0621, 0.0683, 0.0759, 0.0790, 0.0867, 0.0913, 0.0943, 0.0989, 0.1035, 0.1097, 0.1127, 0.1158, 0.1235, 0.1281, 0.1342, 0.1388, 0.1404, 0.1434, 0.1465, 0.1496, 0.1542, 0.1618, 0.1664, 0.1695, 0.1726, 0.1772, 0.1802, 0.1894, 0.1940, 0.2033, 0.2063, 0.2125, 0.2201, 0.2247, 0.2278, 0.2355, 0.2385, 0.2447, 0.2508, 0.2554, 0.2646, 0.2723, 0.2800, 0.2830, 0.2953, 0.3014, 0.3106, 0.3198, 0.3244, 0.3275, 0.3352, 0.3382, 0.3459, 0.3582, 0.3628, 0.3766, 0.3919, 0.4073, 0.4134, 0.4241, 0.4395, 0.4518, 0.4640, 0.4794, 0.4993, 0.5239, 0.5315, 0.5545, 0.5622, 0.5914, 0.6113, 0.6251, 0.6588, 0.6727, 0.6972, 0.7171, 0.7401, 0.7693, 0.7908, 0.8076, 0.8260, 0.8736, 0.9027, 0.9426, 1.0025, 1.0623, 1.1175, 1.1758, 1.2832, 1.3814};
  double y_3[101]={0.0000, 0.0100, 0.0200, 0.0300, 0.0400, 0.0500, 0.0600, 0.0700, 0.0800, 0.0900, 0.1000, 0.1100, 0.1200, 0.1300, 0.1400, 0.1500, 0.1600, 0.1700, 0.1800, 0.1900, 0.2000, 0.2100, 0.2200, 0.2300, 0.2400, 0.2500, 0.2600, 0.2700, 0.2800, 0.2900, 0.3000, 0.3100, 0.3200, 0.3300, 0.3400, 0.3500, 0.3600, 0.3700, 0.3800, 0.3900, 0.4000, 0.4100, 0.4200, 0.4300, 0.4400, 0.4500, 0.4600, 0.4700, 0.4800, 0.4900, 0.5000, 0.5100, 0.5200, 0.5300, 0.5400, 0.5500, 0.5600, 0.5700, 0.5800, 0.5900, 0.6000, 0.6100, 0.6200, 0.6300, 0.6400, 0.6500, 0.6600, 0.6700, 0.6800, 0.6900, 0.7000, 0.7100, 0.7200, 0.7300, 0.7400, 0.7500, 0.7600, 0.7700, 0.7800, 0.7900, 0.8000, 0.8100, 0.8200, 0.8300, 0.8400, 0.8500, 0.8600, 0.8700, 0.8800, 0.8900, 0.9000, 0.9100, 0.9200, 0.9300, 0.9400, 0.9500, 0.9600, 0.9700, 0.9800, 0.9900, 1.0000};
  double x_4[101]={0.0023, 0.0100, 0.0115, 0.0161, 0.0192, 0.0253, 0.0284, 0.0314, 0.0360, 0.0391, 0.0407, 0.0422, 0.0483, 0.0499, 0.0529, 0.0560, 0.0591, 0.0652, 0.0683, 0.0713, 0.0744, 0.0775, 0.0790, 0.0821, 0.0836, 0.0867, 0.0897, 0.0913, 0.0943, 0.0974, 0.0989, 0.1035, 0.1051, 0.1097, 0.1112, 0.1143, 0.1158, 0.1189, 0.1220, 0.1266, 0.1312, 0.1327, 0.1373, 0.1388, 0.1450, 0.1480, 0.1542, 0.1572, 0.1588, 0.1618, 0.1664, 0.1695, 0.1756, 0.1787, 0.1864, 0.1894, 0.1956, 0.2079, 0.2186, 0.2217, 0.2309, 0.2355, 0.2493, 0.2585, 0.2646, 0.2738, 0.2800, 0.2876, 0.2938, 0.3076, 0.3152, 0.3290, 0.3352, 0.3428, 0.3551, 0.3720, 0.3781, 0.3858, 0.3965, 0.4134, 0.4226, 0.4334, 0.4487, 0.4702, 0.4901, 0.5147, 0.5315, 0.5622, 0.5960, 0.6144, 0.6527, 0.6987, 0.7325, 0.8107, 0.8475, 0.9043, 0.9641, 1.0009, 1.0822, 1.1466, 1.3752};
  double y_4[101]={0.0000, 0.0100, 0.0200, 0.0300, 0.0400, 0.0500, 0.0600, 0.0700, 0.0800, 0.0900, 0.1000, 0.1100, 0.1200, 0.1300, 0.1400, 0.1500, 0.1600, 0.1700, 0.1800, 0.1900, 0.2000, 0.2100, 0.2200, 0.2300, 0.2400, 0.2500, 0.2600, 0.2700, 0.2800, 0.2900, 0.3000, 0.3100, 0.3200, 0.3300, 0.3400, 0.3500, 0.3600, 0.3700, 0.3800, 0.3900, 0.4000, 0.4100, 0.4200, 0.4300, 0.4400, 0.4500, 0.4600, 0.4700, 0.4800, 0.4900, 0.5000, 0.5100, 0.5200, 0.5300, 0.5400, 0.5500, 0.5600, 0.5700, 0.5800, 0.5900, 0.6000, 0.6100, 0.6200, 0.6300, 0.6400, 0.6500, 0.6600, 0.6700, 0.6800, 0.6900, 0.7000, 0.7100, 0.7200, 0.7300, 0.7400, 0.7500, 0.7600, 0.7700, 0.7800, 0.7900, 0.8000, 0.8100, 0.8200, 0.8300, 0.8400, 0.8500, 0.8600, 0.8700, 0.8800, 0.8900, 0.9000, 0.9100, 0.9200, 0.9300, 0.9400, 0.9500, 0.9600, 0.9700, 0.9800, 0.9900, 1.0000};
  double x_5[101]={0.0008, 0.0054, 0.0100, 0.0130, 0.0161, 0.0192, 0.0222, 0.0238, 0.0268, 0.0268, 0.0299, 0.0314, 0.0345, 0.0360, 0.0391, 0.0407, 0.0437, 0.0453, 0.0483, 0.0514, 0.0529, 0.0545, 0.0575, 0.0621, 0.0637, 0.0652, 0.0667, 0.0683, 0.0729, 0.0759, 0.0790, 0.0805, 0.0851, 0.0867, 0.0913, 0.0928, 0.0989, 0.1005, 0.1051, 0.1066, 0.1097, 0.1127, 0.1174, 0.1204, 0.1235, 0.1266, 0.1296, 0.1327, 0.1358, 0.1388, 0.1419, 0.1450, 0.1496, 0.1542, 0.1572, 0.1618, 0.1649, 0.1695, 0.1772, 0.1833, 0.1925, 0.2002, 0.2033, 0.2109, 0.2201, 0.2247, 0.2324, 0.2355, 0.2431, 0.2508, 0.2569, 0.2631, 0.2707, 0.2830, 0.2907, 0.3030, 0.3122, 0.3168, 0.3260, 0.3398, 0.3505, 0.3597, 0.3659, 0.3735, 0.3919, 0.4119, 0.4211, 0.4364, 0.4656, 0.4794, 0.4978, 0.5147, 0.5576, 0.6144, 0.6374, 0.6834, 0.7401, 0.7724, 0.8537, 0.9963, 1.3154};
  double y_5[101]={0.0000, 0.0100, 0.0200, 0.0300, 0.0400, 0.0500, 0.0600, 0.0700, 0.0800, 0.0900, 0.1000, 0.1100, 0.1200, 0.1300, 0.1400, 0.1500, 0.1600, 0.1700, 0.1800, 0.1900, 0.2000, 0.2100, 0.2200, 0.2300, 0.2400, 0.2500, 0.2600, 0.2700, 0.2800, 0.2900, 0.3000, 0.3100, 0.3200, 0.3300, 0.3400, 0.3500, 0.3600, 0.3700, 0.3800, 0.3900, 0.4000, 0.4100, 0.4200, 0.4300, 0.4400, 0.4500, 0.4600, 0.4700, 0.4800, 0.4900, 0.5000, 0.5100, 0.5200, 0.5300, 0.5400, 0.5500, 0.5600, 0.5700, 0.5800, 0.5900, 0.6000, 0.6100, 0.6200, 0.6300, 0.6400, 0.6500, 0.6600, 0.6700, 0.6800, 0.6900, 0.7000, 0.7100, 0.7200, 0.7300, 0.7400, 0.7500, 0.7600, 0.7700, 0.7800, 0.7900, 0.8000, 0.8100, 0.8200, 0.8300, 0.8400, 0.8500, 0.8600, 0.8700, 0.8800, 0.8900, 0.9000, 0.9100, 0.9200, 0.9300, 0.9400, 0.9500, 0.9600, 0.9700, 0.9800, 0.9900, 1.0000};
  double x_6[101]={0.0023, 0.0054, 0.0069, 0.0084, 0.0100, 0.0130, 0.0161, 0.0176, 0.0192, 0.0207, 0.0238, 0.0238, 0.0253, 0.0284, 0.0284, 0.0314, 0.0330, 0.0345, 0.0360, 0.0376, 0.0407, 0.0422, 0.0453, 0.0468, 0.0483, 0.0499, 0.0529, 0.0545, 0.0575, 0.0575, 0.0621, 0.0621, 0.0637, 0.0652, 0.0683, 0.0698, 0.0713, 0.0729, 0.0744, 0.0775, 0.0805, 0.0821, 0.0851, 0.0867, 0.0913, 0.0943, 0.0989, 0.1020, 0.1051, 0.1097, 0.1158, 0.1189, 0.1220, 0.1250, 0.1281, 0.1312, 0.1342, 0.1373, 0.1404, 0.1465, 0.1480, 0.1511, 0.1572, 0.1618, 0.1664, 0.1726, 0.1756, 0.1802, 0.1864, 0.1925, 0.2017, 0.2048, 0.2094, 0.2140, 0.2186, 0.2263, 0.2293, 0.2355, 0.2477, 0.2539, 0.2569, 0.2615, 0.2723, 0.2938, 0.2984, 0.3106, 0.3413, 0.3597, 0.3781, 0.3965, 0.4287, 0.4410, 0.4533, 0.4962, 0.5285, 0.5929, 0.6266, 0.6987, 0.7816, 0.9488, 1.3108};
  double y_6[101]={0.0000, 0.0100, 0.0200, 0.0300, 0.0400, 0.0500, 0.0600, 0.0700, 0.0800, 0.0900, 0.1000, 0.1100, 0.1200, 0.1300, 0.1400, 0.1500, 0.1600, 0.1700, 0.1800, 0.1900, 0.2000, 0.2100, 0.2200, 0.2300, 0.2400, 0.2500, 0.2600, 0.2700, 0.2800, 0.2900, 0.3000, 0.3100, 0.3200, 0.3300, 0.3400, 0.3500, 0.3600, 0.3700, 0.3800, 0.3900, 0.4000, 0.4100, 0.4200, 0.4300, 0.4400, 0.4500, 0.4600, 0.4700, 0.4800, 0.4900, 0.5000, 0.5100, 0.5200, 0.5300, 0.5400, 0.5500, 0.5600, 0.5700, 0.5800, 0.5900, 0.6000, 0.6100, 0.6200, 0.6300, 0.6400, 0.6500, 0.6600, 0.6700, 0.6800, 0.6900, 0.7000, 0.7100, 0.7200, 0.7300, 0.7400, 0.7500, 0.7600, 0.7700, 0.7800, 0.7900, 0.8000, 0.8100, 0.8200, 0.8300, 0.8400, 0.8500, 0.8600, 0.8700, 0.8800, 0.8900, 0.9000, 0.9100, 0.9200, 0.9300, 0.9400, 0.9500, 0.9600, 0.9700, 0.9800, 0.9900, 1.0000};
  double x_7[101]={0.0008, 0.0038, 0.0054, 0.0084, 0.0084, 0.0100, 0.0100, 0.0115, 0.0130, 0.0161, 0.0176, 0.0176, 0.0207, 0.0222, 0.0238, 0.0238, 0.0253, 0.0268, 0.0284, 0.0299, 0.0314, 0.0314, 0.0330, 0.0345, 0.0360, 0.0376, 0.0391, 0.0391, 0.0437, 0.0468, 0.0483, 0.0514, 0.0529, 0.0545, 0.0560, 0.0591, 0.0606, 0.0621, 0.0652, 0.0667, 0.0683, 0.0698, 0.0713, 0.0729, 0.0729, 0.0759, 0.0775, 0.0775, 0.0805, 0.0836, 0.0851, 0.0882, 0.0913, 0.0959, 0.0959, 0.0989, 0.1020, 0.1051, 0.1081, 0.1097, 0.1127, 0.1158, 0.1204, 0.1250, 0.1342, 0.1373, 0.1404, 0.1465, 0.1496, 0.1557, 0.1634, 0.1680, 0.1710, 0.1756, 0.1772, 0.1833, 0.1894, 0.1956, 0.2017, 0.2109, 0.2201, 0.2263, 0.2355, 0.2447, 0.2585, 0.2646, 0.2769, 0.2846, 0.2984, 0.3137, 0.3490, 0.3613, 0.3766, 0.4395, 0.4610, 0.4978, 0.5637, 0.5929, 0.6834, 0.8322, 1.1006};
  double y_7[101]={0.0000, 0.0100, 0.0200, 0.0300, 0.0400, 0.0500, 0.0600, 0.0700, 0.0800, 0.0900, 0.1000, 0.1100, 0.1200, 0.1300, 0.1400, 0.1500, 0.1600, 0.1700, 0.1800, 0.1900, 0.2000, 0.2100, 0.2200, 0.2300, 0.2400, 0.2500, 0.2600, 0.2700, 0.2800, 0.2900, 0.3000, 0.3100, 0.3200, 0.3300, 0.3400, 0.3500, 0.3600, 0.3700, 0.3800, 0.3900, 0.4000, 0.4100, 0.4200, 0.4300, 0.4400, 0.4500, 0.4600, 0.4700, 0.4800, 0.4900, 0.5000, 0.5100, 0.5200, 0.5300, 0.5400, 0.5500, 0.5600, 0.5700, 0.5800, 0.5900, 0.6000, 0.6100, 0.6200, 0.6300, 0.6400, 0.6500, 0.6600, 0.6700, 0.6800, 0.6900, 0.7000, 0.7100, 0.7200, 0.7300, 0.7400, 0.7500, 0.7600, 0.7700, 0.7800, 0.7900, 0.8000, 0.8100, 0.8200, 0.8300, 0.8400, 0.8500, 0.8600, 0.8700, 0.8800, 0.8900, 0.9000, 0.9100, 0.9200, 0.9300, 0.9400, 0.9500, 0.9600, 0.9700, 0.9800, 0.9900, 1.0000}

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A user equipment (UE) operable to communicate channel state information in a wireless network, the UE comprising:
    transceiver circuitry arranged to receive, at the UE, from an Enhanced node B (eNB), a plurality of orthogonal frequency division multiple access (OFDMA) signals;
    processing circuitry arranged to derive one or more principal eigen beams from the received OFDMA signals, the principal eigen beams having a rank greater than or equal to one,
    the processing circuitry arranged to derive quantized eigen beams from the principal eigen beams;
    the processing circuitry further arranged to select, in response to the quantized eigen beams, a subset of available antenna ports on the eNB for receiving from the eNB and transmitting to the eNB; and
    the transceiver circuitry arranged to communicate to the eNB, via a Channel State Information Reference Signal (CSI-RS), a bit pattern of the quantized eigen beams and at least one of a wideband channel quality indicator (CQI) or a subband CQI conditioned on the quantized eigen beams.

2. The UE of claim 1, wherein the processing circuitry is further arranged to calculate, in response to the quantized eigen beams, a plurality of phase values and a plurality of amplitude values, each amplitude and phase value corresponding to a respective antenna port in the subset of available antenna ports, each amplitude value corresponding to a signal amplification factor, each phase value corresponding to a signal phase delay.

3. The UE of claim 1, wherein the processing circuitry uses a Givens rotation to quantize Nc antenna ports for the principal eigen beams, where Nc is a number of antenna ports on the UE.

4. The UE of claim 3, wherein the processing circuitry further quantizes a precoder of rank r into X phases, where X is a positive integer with value equal to $2*\Sigma_{k=0}^{r}(Nc-k-1)$.

5. The UE of claim 4,
    wherein the processing circuitry evenly quantizes a first half of the phases to have Np bits per phase, where Np is a number of layers; and
    wherein the processing circuitry unevenly quantizes a second half of the phases to have Ns bits per phase;
    wherein Np and Ns are positive integers.

6. The UE of claim 5,
    wherein the processing circuitry uses the first half of the phases to rotate each element of the precoder from a complex number to a nonnegative real number; and
    wherein the processing circuitry uses the second half of the phases to rotate the precoder to an identity matrix.

7. The UE of claim 4,
    wherein the processing circuitry quantizes each phase, of the first half of the phases, evenly in the range between 0 and 2*pi; and
    wherein the processing circuitry quantizes each phase, of the first half of the phases, according to the equation $$D_0 = \mathrm{diag}([e^{j\delta_{0,0}} e^{j\delta_{1,0}} e^{j\delta_{2,0}} e^{j\delta_{3,0}} e^{j\delta_{4,0}} e^{j\delta_{5,0}} e^{j\delta_{6,0}} 1]).$$

8. The UE of claim 4, wherein the processing circuitry quantizes each phase, of the second half of the phases, in the range between 0 and 2*pi using a cumulative distribution function (CDF).

9. The UE of claim 8,
    wherein the processing circuitry maps each phase, of the second half of the phases, to the CDF;
    wherein the processing circuitry evenly quantizes a phase probability in a range between 0 and 1 to form a quantized probability;
    wherein the processing circuitry maps the quantized probability using an inverse of the CDF to a quantized phase; and
    wherein the processing circuitry sequentially quantizes phases of each column of the CDF.

10. The UE of claim 1, wherein the processing circuitry further quantizes a precoder of rank r into X phases and X ratios, where X is a positive integer with value equal to $2*\Sigma_{k=0}^{r}(Nc-k-1)$, and where Nc is a number of antenna ports on the UE.

11. The UE of claim 10, wherein the processing circuitry further quantizes the ratios according to the equations $$a_{2,0} = \begin{bmatrix} \alpha_{0,0} \\ \alpha_{1,0} \end{bmatrix},\ b_{2,0} = \begin{bmatrix} \alpha_{2,0} \\ \alpha_{3,0} \end{bmatrix},\ \text{and } \gamma_{2,0} = \frac{|a_{2,0}|^2 - |b_{2,0}|^2}{|a_{2,0}|^2 + |b_{2,0}|^2};$$

$$a_{2,1} = \begin{bmatrix} \alpha_{4,0} \\ \alpha_{5,0} \end{bmatrix},\ b_{2,1} = \begin{bmatrix} \alpha_{6,0} \\ \alpha_{7,0} \end{bmatrix},\ \text{and } \gamma_{2,1} = \frac{|a_{2,1}|^2 - |b_{2,1}|^2}{|a_{2,1}|^2 + |b_{2,1}|^2};$$

$$a_{1,0} = \alpha_{0,0},\ b_{1,0} = \alpha_{1,0},\ \text{and } \gamma_{1,0} = \frac{|a_{1,0}|^2 - |b_{1,0}|^2}{|a_{1,0}|^2 + |b_{1,0}|^2};$$

$$a_{1,1} = \alpha_{2,0},\ b_{1,1} = \alpha_{3,0},\ \text{and } \gamma_{1,1} = \frac{|a_{1,1}|^2 - |b_{1,1}|^2}{|a_{1,1}|^2 + |b_{1,1}|^2};$$

$$a_{1,2} = \alpha_{4,0},\ b_{1,2} = \alpha_{5,0},\ \text{and } \gamma_{1,2} = \frac{|a_{1,2}|^2 - |b_{1,2}|^2}{|a_{1,2}|^2 + |b_{1,2}|^2};$$

and $$a_{1,3} = \alpha_{6,0},\ b_{1,3} = \alpha_{7,0},\ \text{and } \gamma_{1,3} = \frac{|a_{1,3}|^2 - |b_{1,3}|^2}{|a_{1,3}|^2 + |b_{1,3}|^2}.$$

12. The UE of claim 1,
    wherein the transceiver circuitry further receives data sent from antenna elements of the eNB using a precoder calculated from the principal eigen beams; and wherein each received OFDMA signal is transmitted with an independent beamforming pattern from an antenna array of the eNB.

13. The UE of claim 1, wherein the transceiver circuitry is coupled to at least one antenna.

14. A method for communicating channel state information from a user equipment (UE) to an Enhanced node B (eNB) in a wireless network, the method comprising:
deriving, at the UE, one or more principal eigen beams from received orthogonal frequency division multiple access (OFDMA) signals, the principal eigen beams having a rank greater than or equal to one;
deriving, at the UE, quantized eigen beams from the principal eigen beams; and
selecting, at the UE, in response to the quantized eigen beams, a subset of available antenna ports on the eNB for receiving from the eNB and transmitting to the eNB; and
wherein the UE uses a Givens rotation to quantize Nc antenna ports for the principal eigen beams, where Nc is a number of antenna ports on the UE.

15. The method of claim 14, further comprising:
communicating, from the UE to the eNB, via a Channel State Information Reference Signal (CSI-RS), a bit pattern of the quantized eigen beams and at least one of a wideband channel quality indicator (CQI) or a subband CQI conditioned on the quantized eigen beams.

16. The method of claim 15, further comprising, at the UE:
quantizing a precoder of rank r into X phases, where X is a positive integer with value equal to $2*\Sigma_{k=0}^{r}(Nc-k-1)$;
wherein the UE evenly quantizes a first half of the phases to have Np bits per phase, where Np is a number of layers; and
wherein the UE unevenly quantizes a second half of the phases to have Ns bits per phase where Np and Ns are positive integers.

17. The method of claim 16,
wherein the UE uses the first half of the phases to rotate each element of the precoder from a complex number to a nonnegative real number; and
wherein the UE uses the second half of the phases to rotate the precoder to an identity matrix.

18. A non-transitory computer-readable medium containing instructions which, when executed, perform operations to communicate channel state information from a user equipment (UE) to an Enhanced node B (eNB) in a wireless network, the operations to arrange the UE to:
receive from the eNB a plurality of orthogonal frequency division multiple access (OFDMA) signals;
derive one or more principal eigen beams from the received OFDMA signals, the principal eigen beams having a rank greater than or equal to one;
derive quantized eigen beams from the principal eigen beams;
select, in response to the quantized eigen beams, a subset of available antenna ports on the eNB for receiving from the eNB and transmitting to the eNB; and
communicate, from the UE to the eNB, via a Channel State Information Reference Signal (CSI-RS), a bit pattern of the quantized eigen beams and at least one of a wideband channel quality indicator (CQI) or a subband CQI conditioned on the quantized eigen beams;
wherein the operations further arrange the UE to quantize a precoder of rank r into X phases and X ratios, where X is a positive integer with value equal to $2*\Sigma_{k=0}^{r}(Nc-k-1)$, and where Nc is a number of antenna ports on the UE.

19. The non-transitory computer-readable medium of claim 18,
wherein the operations further arrange the UE to receive data sent from antenna elements of the eNB using a precoder calculated from the principal eigen beams; and
wherein each received OFDMA signal is transmitted with an independent beamforming pattern from an antenna array of the eNB.

\* \* \* \* \*